Nov. 12, 1968  R. J. HEIDEMAN ET AL  3,410,294

SHUTTLE VALVE

Filed Dec. 27, 1966

INVENTORS:
ROBERT J. HEIDEMAN
BY WILLIAM J. CHORKEY

Donnelly, Mentag & Harrington

ATTORNEYS

United States Patent Office 3,410,294
Patented Nov. 12, 1968

3,410,294
SHUTTLE VALVE
Robert J. Heideman, Detroit, and William J. Chorkey, Farmington, Mich., assignors to Ace Controls Inc., Farmington, Mich., a corporation of Michigan
Filed Dec. 27, 1966, Ser. No. 604,862
4 Claims. (Cl. 137—113)

ABSTRACT OF THE DISCLOSURE

A valve body having a support member. An elastic valve element slidably mounted on said support member to be moved by fluid pressure into engagement with either of two aligned inlet ports.

This invention relates to the valve art, and more particularly, to a novel and improved shuttle valve.

Shuttle valves are well known in the prior art and they include a valve element moved by fluid under pressure between two inlet ports for alternately directing fluid from said inlet ports to a single outlet port. An example of such prior art valves is shown in U.S. Patent No. 2,408,799. The aforementioned prior art patent shows a shuttle valve having a metal ball valve element moved by fluid pressure between two valve seats. A disadvantage of shuttle valves of the type shown in said patent is that the movable ball valve element is made from metal and it seats on a metal valve seat at each end of its travel. In many cases, the metal valve element hitting against the metal valve seat in the prior art shuttle valve has caused the valve seat to be peened over or cracked, thereby causing the valve to leak. In order to overcome such disadvantage other prior art valves have been provided with rubber seal means, either on the metal valve element, or in a position on the valve seat, so as to absorb the impact of the metal valve element when it engages the metal valve seat. A disadvantage of the latter type prior art valve is that it is costly and complicated. It also still has the inherent disadvantage of the use of a heavy valve element and this restricts the lower limit of the pressure range over which the valve may be used.

In view of the foregoing, it is an important object of the present invention to provide a novel and improved shuttle valve which overcomes the aforementioned disadvantages of the prior art shuttle valves.

It is another object of the present invention to provide a novel and improved shuttle valve which incorporates a lightweight valve element that functions as a combination seal member and valve closure element, and which is sensitive and may be used in various fluid pressure systems.

It is still another object of the present invention to provide a novel and improved shuttle valve which employs an elastic, lightweight O-ring as the valve element, thereby greatly reducing the inertia and the impact values of the sealing structure of the valve.

It is still a further object of the present invention to provide a novel and improved shuttle valve which is simple and compact in construction, efficient in operation, economical to manufacture, and operable at low cracking pressures as well as at the high pressures normally encountered in conventional pneumatic systems and other types of fluid operated systems.

It is another object of the present invention to provide a novel and improved shuttle valve which includes, a valve body having a chamber therein; a first inlet port and a second inlet port in said valve body; a first valve seat in said valve body communicating said first inlet port with said chamber, and a second valve seat axially aligned with and spaced apart from said first valve seat and communicating said second inlet port with said chamber; a support member disposed between said spaced apart valve seats in axial alignment therewith; an outlet port in said valve body communicating with said chamber; and, an elastic valve element slidably mounted on said support member for movement into seating and blocking engagement with said second valve seat by fluid under pressure entering said first inlet port when said second inlet port is exhausted, and into seating and blocking engagement with said first valve seat by fluid under pressure entering said second inlet port when said first inlet port is exhausted.

Other objects, features and advantages of this invention will be apparent from the following detailed description, appended claims, and the accompanying drawing:

Figure 2:
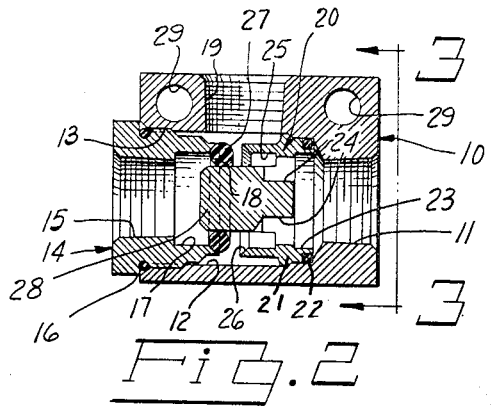
FIG. 2 is an elevational section view of the structure illustrated in FIG. 1, taken along the line 2—2 thereof, and looking in the direction of the arrows.
Figure 3:
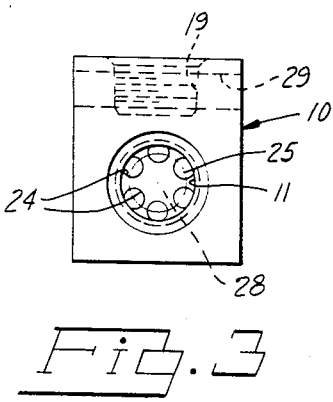
FIG. 3 is an end elevational view of the structure illustrated in FIG. 2, taken along the line 3—3 thereof, and looking in the direction of the arrows; and, FIG. 4 is an elevational section view, similar to FIG. 2, showing the O-ring valve element shifted to the other operative position.
Figure 4:
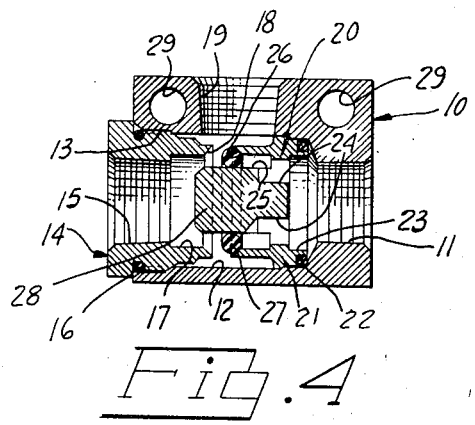

Referring now to the drawing, and in particular to FIGS. 2 and 4, the numeral 10 generally indicates a valve body of an illustrative embodiment of the invention. The valve body 10 is illustrated as being block shaped in overall configuration, however, it will be understood, that it may be of any desired shape. The valve body 10 is provided with a first inlet port 11 which is threaded and adapted to be connected to a first suitable source of fluid under pressure, as for example, a source of pressurized air. The inet port 11 communicates with an internal chamber 12 formed in the valve body 10. The chamber 12 is cylindrical in cross section and it has an open end 13 on the end of the valve body opposite to the inlet port 11.

Figure 1:
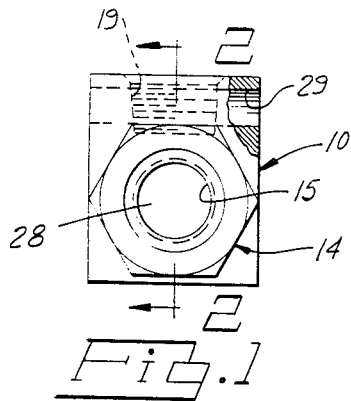
FIG. 1 is an end elevational view of a shuttle valve made in accordance with the principles of the present invention.

As shown in FIGS. 1 and 2, the open end 13 of the chamber 12 is enclosed by a cap generally indicated by the numeral 14. The cap 14 is secured in place in the chamber open end 13 by any suitable means, as by being threaded in place. The cap 14 is provided with a second inlet port 15 which is coaxially disposed relative to the first inlet port 11. The second inlet port 15 is threaded and adapted to be connected to a second suitable source of fluid under pressure, as for example, a source of pressurized air. A static O-ring seal 16 is mounted around the cap 14 and it engages the valve body 10 for preventing leakage between the cap 14 and the valve body 10.

As shown in FIG. 2, the cap 14 includes a passage 17 which communicates the second inlet port 15 with the internal chamber 12 of the valve body 10. A circular valve seat 18 having an inwardly tapered face is formed on the inner end of the cap 14 at the junction point of the passage 17 and the chamber 12. An outlet port 19 is formed in the valve body 10 and communicates with the internal chamber 12. The outlet port 19 is threaded and is adapted to be connected to an apparatus to be alternately supplied with fluid under pressure from the two inlet ports 11 and 15. The outlet port 19 is disposed at right angles to the inlet ports 11 and 15, in an intermediate position between these inlet ports. The flow of pressurized fluid from the inlet ports 11 and 15 to the outlet port 19 is controlled in an alternate manner by the following described shuttle valve structure.

As shown in FIGS. 2 and 4 a carrier member, generally indicated by the number 20, is mounted at the inner end of the chamber 12 in a position adjacent the inner end of the first inlet port 11. The carrier member 20 is provided with an enlarged outer end 21 which is press-fitted into the inner end of the chamber 12. A static O-ring seal 22 is disposed around the carrier enlarged portion 21 and engages the valve body 10 for sealing against leakage between the carrier member 20 and the valve body 10.

The first inlet port 11 communicates with the internal chamber 12 by a passage means formed through the carrier 20. The passage means formed through the carrier member 20 comprises the annular recess 23 formed in the end of the carrier adjacent the inlet port 11 and which communicates with the inlet port 11. The recess 23 communicates with a plurality of axially extended, circumferentially disposed bores 24 which in turn communicate at their inner ends with an annular recess or under-cut indicated by the numeral 25. The total cross sectional area of the bores 24 should be equal to or greater than the cross sectional area of the annular or ring shaped recess 25.

As best seen in FIG. 2, the inner end of the annular recess 25 communicates with the internal chamber 12. A first valve seat 26 is formed on the carrier member 20 around the end of the annular recess 25. The valve seat 26 is provided with an inwardly tapered face. The heretofore described seat 18 may be termed the second valve seat. As shown in FIG. 2, the valve seats 18 and 26 are spaced apart from each other and they are adapted to be engaged by the O-ring valve element 27.

The O-ring valve element 27 is made from any suitable material, as for example, an elastic material such as rubber. A suitable material is the material used for making O-rings which are used in the sealing art for sealing purposes, such as the sealing O-rings 16 and 22. The O-ring valve element 27 is slidably mounted for movement between the valve seats 18 and 26 on a support member 28 which is disposed between the spaced apart valve seats 18 and 26, and in axial alignment therewith. The support member 28 is cylindrical in overall configuration and is integrally formed as a cylindrical shaft on the carrier member 20. As shown in FIG. 2, the cylindrical support member 28 extends into the recess 25 and the passage 17, so that the discharge cross sectional areas between the cylindrical support member 28 and the valve seats 18 and 26 are equal in each case. The discharge areas are formed as annular or ring-shaped discharge areas which are adapted to be alternately blocked by the O-ring 27.

As shown in FIGS. 1 and 2, the numerals 29 indicate a pair of mounting holes for mounting the valve on a machine tool, or the like, which is to include the shuttle valve as a part of its fluid operating system. It will be seen, that several of the shuttle valves of the present invention may be ganged or mounted together in communication with each other, and they may be mounted on a supporting structure with long tie rods extended through the mounting holes 29.

The operation of the shuttle valve of the present invention will be understood by assuming that the O-ring valve element 27 is in the position shown in FIG. 2. The second outlet port 15 would be exhausted under these conditions and fluid under pressure would enter through the first inlet port 11 and pass through the recess 23, the holes 24, and the recess 25 into the internal chamber 12, from whence it exhausts through the outlet port 19. The O-ring valve element 27 blocks the passage 17 and the second inlet port 15. When the first inlet port 11 is exhausted and fluid under pressure is admitted into the second inlet port 15, the incoming pressurized fluid will engage the O-ring valve element 27 and move it to the right to the position shown in FIG. 4, where it seats on the first valve seat 26 and blocks off flow of fluid through the inlet port 11. It is thus seen, that the O-ring valve element 27 is either in one of two positions, either blocking the first inlet port 11 or blocking the second inlet port 15.

The elastic O-ring valve element 27 functions as a combination shuttling closure and sealing member. The valve element 27 which is made from a lightweight elastic material eliminates the impact damage which normally occurs to the valve seats of a shuttle valve provided with a metal valve element. The shuttle valve of the present invention will have a longer and trouble free life as compared to the prior art shuttle valves. The elastic O-ring valve element 27 greatly reduces the inertia and impact values of the sealing arrangements of the valve as the fluid under pressure moves the valve between the valve seats 18 and 26. The lightweight, O-ring valve element 27 permits the shuttle valve to operate at very low cracking pressures, and the shuttle valve of the present invention is so sensitive that it may be moved between its two operating positions by the mere inhaling and exhaling of a person. This last mentioned feature illustrates the sensitivity of the valve and the fact that it can be used from extremely low pressures over a range up to the highest pressures normally used on pneumatic and other fluid operated control systems.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. A shuttle valve comprising:
   (a) a valve body having a chamber therein;
   (b) a first inlet port and a second inlet port in said valve body;
   (c) a first valve seat in said valve body communicating said first inlet port with said chamber, and a second valve seat axially aligned with and spaced apart from said first valve seat and communicating said second inlet port with said chamber;
   (d) a support member disposed between said spaced apart valve seats in axial alignment therewith;
   (e) an outlet port in said valve body communicating with said chamber; and,
   (f) an elastic valve element slidably mounted on said support member for movement into seating and blocking engagement with said second valve seat by fluid under pressure entering said first inlet port when said second inlet port is exhausted, and into seating and blocking engagement with said first valve seat by fluid under pressure entering said second inlet port when said first inlet port is exhausted.

2. A shuttle valve as defined in claim 1, wherein:
   (a) said first and second inlet ports are disposed in axial alignment with each other.

3. A shuttle valve as defined in claim 1, wherein:
   (a) said elastic valve element comprises an elastic O-ring.

4. A shuttle valve as defined in claim 3, wherein:
   (a) said support member comprises a cylindrical shaft, and said O-ring is slidably mounted on said shaft.

References Cited

UNITED STATES PATENTS

| | | | |
|---|---|---|---|
| 2,408,799 | 10/1946 | Melichar | 137—113 |
| 2,551,045 | 5/1951 | Parker | 137—113 |

NATHAN L. MINTZ, *Primary Examiner.*